United States Patent
Furuya et al.

(10) Patent No.: US 6,837,694 B2
(45) Date of Patent: Jan. 4, 2005

(54) HYDRAULIC PUMP UNIT WITH ORIFICE PLATE FOR VEHICLE BRAKE CONTROL SYSTEM

(75) Inventors: Takayuki Furuya, Kanagawa-Ken (JP); Nobuhiro Tamai, Kanagawa-Ken (JP)

(73) Assignee: Unisia Jecs Corporation, Kanagawa-ken (JP)

( * ) Notice: Subject to any disclaimer, the term of this patent is extended or adjusted under 35 U.S.C. 154(b) by 155 days.

(21) Appl. No.: 10/173,042

(22) Filed: Jun. 18, 2002

(65) Prior Publication Data

US 2003/0047993 A1 Mar. 13, 2003

Related U.S. Application Data

(60) Provisional application No. 60/300,858, filed on Jun. 27, 2001.

(51) Int. Cl.[7] .............................. F04B 11/00; F04B 1/04; F04B 19/00; F04B 39/10
(52) U.S. Cl. ....................... 417/554; 417/273; 417/470; 417/555.1; 417/562; 417/567; 417/569
(58) Field of Search .................................. 417/273, 470, 417/471, 545, 554, 555.1, 562, 563, 567, 569, 570, 571

(56) References Cited

U.S. PATENT DOCUMENTS

| | | | | |
|---|---|---|---|---|
| 699,570 | A | * 5/1902 | Rhine | .................. 417/250 |
| 4,861,234 | A | * 8/1989 | Joy et al. | .................. 417/273 |
| 5,280,746 | A | * 1/1994 | Siegel | .................. 92/169.1 |
| 5,893,896 | A | 4/1999 | Imamura et al. | |
| 5,964,510 | A | 10/1999 | Nakazawa | |
| 6,234,588 | B1 | 5/2001 | Sawada | |
| 6,457,957 | B1 | * 10/2002 | Bauer et al. | .................. 417/562 |

FOREIGN PATENT DOCUMENTS

| | | | | |
|---|---|---|---|---|
| DE | 198 48 035 | * | 4/2000 | .......... F02M/59/06 |
| JP | 10-30576 | * | 2/1998 | .......... F04B/53/16 |
| JP | 11-182448 | * | 7/1999 | .......... F04B/53/12 |
| WO | WO 98/13244 | | 2/1998 | |

* cited by examiner

Primary Examiner—Cheryl J. Tyler
Assistant Examiner—Timothy P. Solak
(74) Attorney, Agent, or Firm—Sughrue Mion, PLLC

(57) ABSTRACT

A hydraulic pump unit for vehicle brake control system comprising a pump housing, a cylinder received in a receiving hole formed in the pump housing. The cylinder has a bottom portion and is provided at the bottom portion with an outlet valve. A plunger is slidingly received in the cylinder and defines a pump chamber in cooperation with the cylinder. An inlet valve provided on the plunger, an inlet passage formed in the pump housing. An opening of the inlet passage is provided in the receiving hole. An outlet passage formed in the pump housing, an opening of the outlet passage is provided in the receiving hole. A plug member for closing an opening of the receiving hole, the plug member is fixed to the bottom portion of the cylinder, and an orifice plate having a passage is arranged between the bottom portion and the plug member.

18 Claims, 4 Drawing Sheets

HYDRAULIC PUMP UNIT WITH ORIFICE PLATE FOR VEHICLE BRAKE CONTROL SYSTEM

CROSS REFERENCE TO THE RELATED APPLICATION

This application claims the benefit of U.S. Provisional Application No. 60/300,858 filed on Jun. 27, 2001, the disclosure of which is incorporated herein by reference.

BACKGROUND OF THE INVENTION

1. Field of the Invention

This invention relates to a hydraulic pump unit used in a vehicle brake control system for an automotive vehicle that restrains an undesirable vehicle behavior, prevents a lock of wheels, generates a wheel-brake cylinder pressure of road wheels in response to a braking operation by a driver, or regulates the wheel-cylinder pressure of the wheels, in accordance with a current vehicle traveling condition.

2. Description of Related Art

It is known that there have been proposed various types of brake control systems for automotive vehicles that restrains an undesirable vehicle behavior, prevents a lock of wheels, or regulates a wheel-brake cylinder pressure of road wheels in response to a current vehicle traveling condition. These types of the brake control systems are disclosed in, for example, Japan Patent Publication (koukai) No. 10-6954 (corresponding to U.S. Pat. No. 5,964,510), the U.S. Pat. No. 6,234,588, the U.S. Pat. No. 5,893,896, and the PCT International Publication No. WO 98/13244, which designated the United States.

The Japan Publication No. 10-6954 discloses a pump unit associated with a hydraulic circuit adapted for a vehicle brake control system so called "traction control system" and "anti skid braking system". The traction control system (hereinafter, referred to as "TCS") restrains slippage of driving wheels that may happen when the driving wheels experience an excessive driving torque due to, for instance, acceleration and a sudden change of road surface conditions. The anti skid braking system (hereinafter, referred to as "ABS") is provided to prevent a lock of the wheels that may occur when a braking force generated by a braking operation of a driver becomes greater than an appropriate braking force with respect to a road surface condition due to, for example, a sudden change of road surface conditions. The U.S. Pat. No. 6,234,588 discloses a brake control system so called "brake by wire system" that provides a braking force in response to the brake pedal operation of the driver. An amount of the brake pedal operation, such as a stroke of the brake pedal operation, depression pressure of the brake pedal operation, and pedal depression speed, is converted to an electric signal. The electrical signal is inputted into an electric control unit (hereinafter, refereed to as "ECU"). Based on the inputted signal, the ECU determines a current vehicle traveling condition, and creates an output signal to generate a reasonable braking force for the brake pedal operation. The U.S. Pat. No. 5,893,896 discloses a vehicular braking system that controls a stability of a vehicular attitude by regulating a braking force according to a variation in the vehicular attitude so as to stabilize the vehicular attitude. The PCT Publication No. WO 98/13244 discloses another brake control system so called "brake assist system" that controls a relationship between the brake pedal operation and a braking force. That is, there sometime is a demand for a stronger braking force than a braking force that a driver intended. The brake assist system provides an effective braking force considering vehicle traveling conditions in which a brake pedal operation is made, by detecting, for instance, a stroke of the brake pedal operation, depression pressure of the brake pedal operation, and pedal depression speed.

According to above described braking systems, there is provided a hydraulic pump unit that returns a surplus brake fluid to a master cylinder that is caused by a pressure-reduction procedure of wheel-brake cylinder pressure performed by such braking systems, or that provides brake fluid to wheel-brake cylinders in order to create the braking force, regardless of the brake pedal operation by the driver, or in response to the brake pedal operation. Such hydraulic pump unit is described in, for example, Japan Patent Publication (koukai) No. 7-47938. According to the publication, the hydraulic pump unit comprises a pump housing, a cylinder, an outlet valve, a plunger, an inlet valve, an inlet passage, an outlet passage, and a plug member. The pump housing has a hole and receives the cylinder therein. The cylinder includes the outlet valve at its bottom portion and receives therein the plunger with a slidable contact. Thus, a pump chamber is defined between a bottom surface of the cylinder and the plunger. The plunger has the inlet valve and is reciprocated by a cam. The inlet passage and the outlet passage have openings in the hole. An opening of the hole opposite to the bottom portion in an axial direction of the hole is closed by the plug member. By this arrangement, a pump function is performed. The hydraulic pump unit also has an orifice that reduces a pulsation generated by a reciprocative movement of the plunger. The orifice is provided in the outlet passage and comprises a main body and a hole. The main body of the orifice is assembled by fitting into the hole.

However, since the main body of the orifice is fitted into the hole, a part of components, i.e., metal shavings, might be shaved when the main body of the orifice is fitted into the hole.

SUMMARY OF THE INVENTION

Accordingly, in view of above-described problems encountered in the conventional art, a principal object of the present invention is to provide a hydraulic pump unit that prevents incorporation of a contamination into a brake fluid.

In order to achieve these and the other objects, there is provided a hydraulic pump unit for vehicle brake control system that comprises a pump housing, a cylinder received in a receiving hole formed in the pump housing. The cylinder has a bottom portion and is provided at the bottom portion with an outlet valve. A plunger received in the cylinder with a slidable contact, the plunger is driven by a cam and defining a pump chamber in cooperation with the cylinder. An inlet valve provided on the plunger, an inlet passage formed in the pump housing. An opening of the inlet passage is provided in the receiving hole. An outlet passage formed in the pump housing, an opening of the outlet passage is provided in the receiving hole. A plug member for closing an opening of the receiving hole, the plug member is fixed to the bottom portion of the cylinder, and an orifice passage formed on an orifice plate, the orifice plate is arranged between the bottom portion and the plug member.

Other aspects and advantages of the invention will become apparent from the following description, taken in conjunction with the accompanying drawings, illustrating by way of example the principals of the invention.

DETAILED DESCRIPTION OF THE PREFERRED EMBODIMENT

Figure 1:
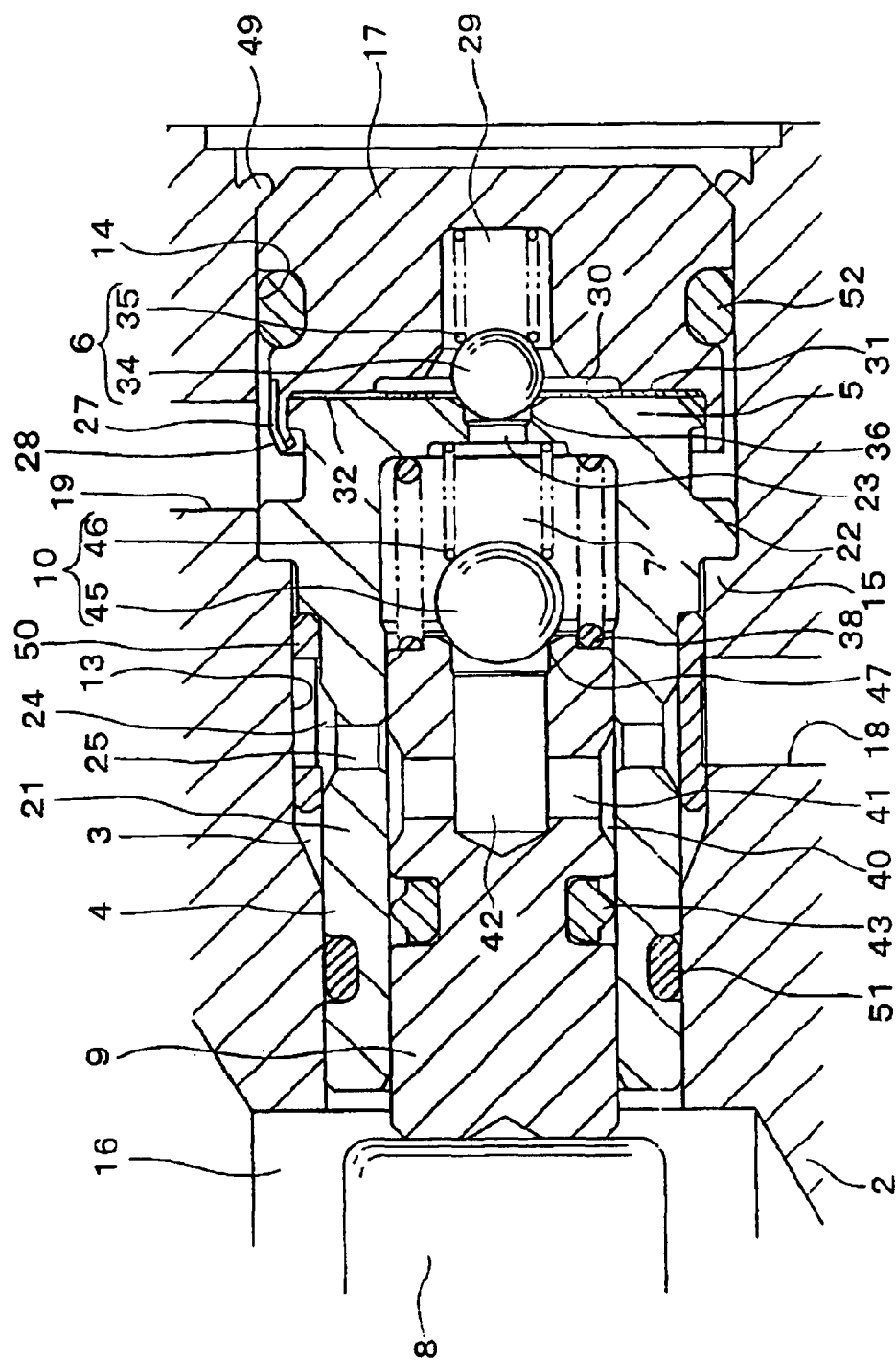
FIG. 1 is a sectional view, showing a hydraulic pump unit according to a preferred embodiment of the present invention.

A hydraulic pump unit for a vehicle brake control system according to a preferred embodiment will now be described with a reference to drawings. As shown in FIG. 1, a pump body comprises a cylinder 4, an outlet valve 6, a plunger 9, and an inlet valve 10. A receiving hole is formed in a pump housing 2, and receives the cylinder 4 therein. The cylinder 4 has an outlet valve 6 at its bottom portion 5. The plunger 9 is received in the cylinder 4 with a movable contact with respect to the cylinder 4, and defines a pump chamber 7 between an end face of the plunger 9 and the bottom portion 5 of the cylinder 4. That is, the cylinder 4 and the plunger 9 cooperatively define the pump chamber 7 on a side of the bottom portion 5. A cam 8 is provided to reciprocate the plunger 9 in order to provide a pump function. The inlet valve 10 is provided on the plunger 9. The receiving hole 3 has a small diameter portion 13 and a large diameter portion 14. Numeral 15 denotes a stepped-portion that is formed between the small diameter portion 13 and the large diameter portion 14. The small diameter portion 13 of the receiving hole 3 communicates with a center hole 16. The center hole 16 accommodates the cam 8 driven by a drive shaft (not shown). The large diameter portion 14 of the receiving hole 3 has an opening that opens outside of the pump housing 2, and the opening is closed by a plug member 17. Openings of an inlet passage 18 and an outlet passage 19 are provided on an inner surface of the receiving hole 3. In detail, the opening of the inlet passage 18 is provided at an inner surface of the small diameter portion 13, and the opening of the outlet passage 19 is provided at an inner surface of the large diameter portion 14.

In the case where the hydraulic pump unit is provided in a hydraulic circuit for an anti-skid braking system (ABS), an upstream portion of the inlet passage 18 communicates with a reservoir (not shown), and a downstream portion of the outlet passage 19 connects with a master cylinder (not shown). However, it easily can be adapted for a hydraulic circuit of other braking systems, such as a traction control system (TCS), a brake by wire system, a brake assist system, and a vehicular attitude (stability) control system. General background on such braking systems including the hydraulic circuit may be found in the U.S. Pat. No. 5,964,510 (describes both ABS and TCS), the U.S. Pat. No. 6,234,588 (brake by wire system), the U.S. Pat. No. 5,893,896 (vehicular attitude control system), and the PCT International Publication No. WO 98/13244, which designated the United States (brake assist system).

The receiving hole 3 receives the cylinder 4. Specifically, a middle portion 21 of the cylinder 4 is placed in the small diameter portion 13, and a flange portion 22 formed on an outer surface of the middle portion 21 is placed in the large diameter portion 14. The flange portion 22 has an abutted-contact with the stepped-portion 15. Thereby, the bottom portion 5 of the cylinder 4 is positioned in the large diameter portion 14 of the receiving hole 3. The cylinder 4 is provided its bottom portion 5 with a valve hole 23 that connects an inside of the cylinder 4 (the pump chamber 7) with an inside of the receiving hole 3. There is also provided a groove portion 24 on the outer surface of the middle portion 21. The groove portion 24 is formed at which the groove portion 24 faces the opening of the inlet passage 18. A penetrating hole 25 is provided at a bottom of the groove portion 24, and is formed in a radial direction of the cylinder 4. Thus, the penetrating hole 25 connects the inlet passage 18 with the pump chamber 7. The plug member 17 is fixed to the bottom portion 5. The plug member 17 and the bottom portion 5 of the cylinder 4 are fixed together by caulking. More particularly, the plug member 17 has a flange portion 27. The flange portion 27 is cylindrical in shape, and extends in an axial direction of the plug member 17. The flange portion 27 is fitted to the cylinder 4. Then, these are fixed together by making a caulking portion 28. According to the preferred embodiment of the present invention, although the plug member 17 and the bottom portion 5 are fixed together by caulking, the plug member 17 may also be screwed to the bottom portion 5. A blind hole 29, an opening of which faces the valve hole 23, is formed in the plug member 17 in the axial direction of the plug member 17.

Figure 2A:
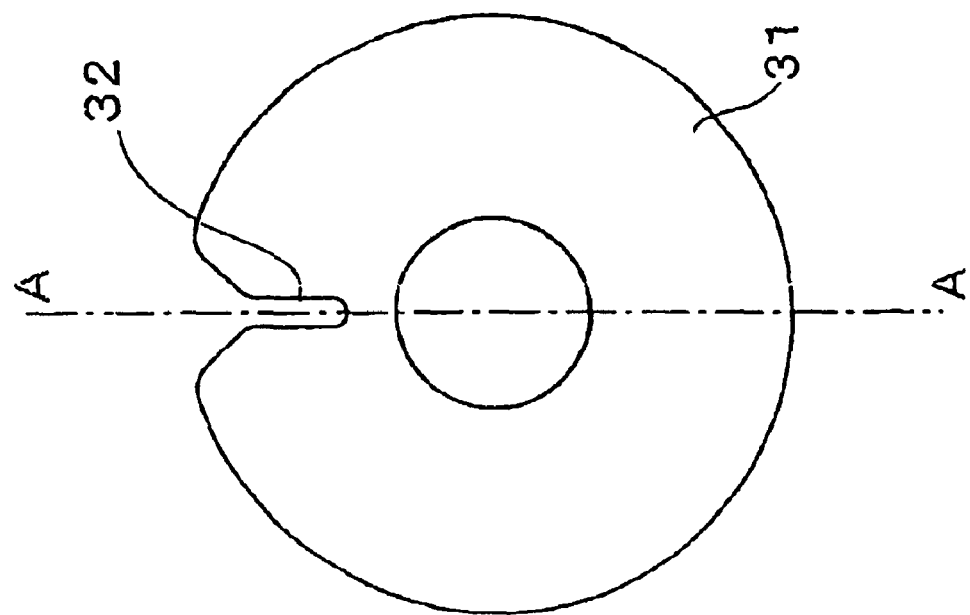
FIG. 2A is a front view of an orifice plate shown in FIG. 1.
Figure 2B:
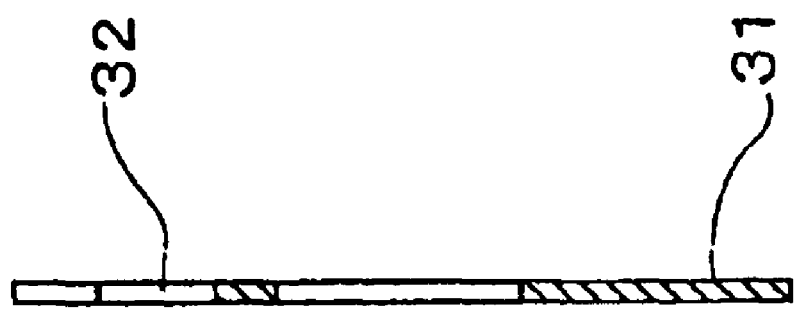
FIG. 2B is a cross sectional view of the orifice plate taken on line A—A of FIG. 2A.
Figure 3:
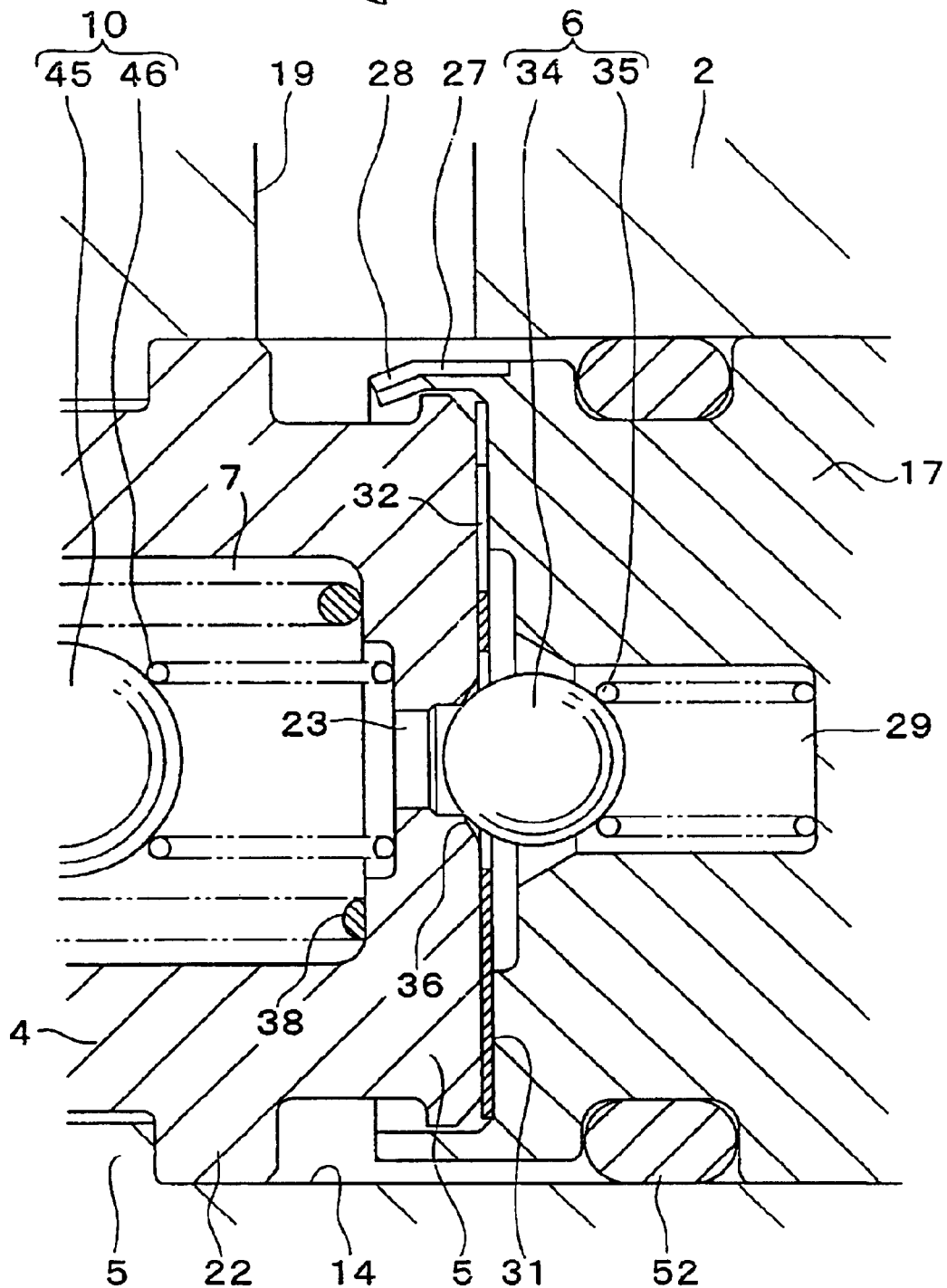
FIG. 3 is an enlarged view, showing components around the orifice plate of FIG. 1.

As shown in FIGS. 1, 2A and 2B, there is provided an orifice plate 31 that is made of steel between the bottom portion 5 and the plug member 17. The orifice plate 31 is formed into an annular shape, and has an orifice passage 32 that comprises a slit formed along a radial direction of the orifice plate 31. The slit is provided with a constant width. A large width portion is formed on an outer side of the slit (orifice passage 32) in the radial direction of the orifice plate 31. The large width portion is formed into a fan-shape. An inner side of the orifice passage 32 extends toward a central hole of the orifice plate 31 so that the valve hole 23 communicates with the outlet passage 19 through the orifice passage 32, a radius-directional aperture defined between a circumference of the bottom portion 5 and the flange 27. The outlet valve 6, which is located at a center of the orifice plate 31, includes a valve ball 34 and a check-spring 35. The check-spring 35 urges the valve ball 34 toward a valve seat 36 formed on an edge of the valve hole 23, and is received in the blind hole 29 of the plug member 17. The valve ball 34 is placed in the central hole of the orifice plate 31. By this arrangement, an outlet chamber 30 is defined in the plug member 17. A spring 38 is provided in the pump chamber 7 for pushing the plunger 9 toward the cam 8. Thus, the plunger 9 always is in an abutted-contact with the cam 8. The plunger 9 has a depressing portion 40, a perforating hole 41, and an impenetrable hole 42. The depressing portion 40 is formed at which the depressing portion 40 faces the penetrating hole 25. The perforating hole 41 is provided in a radial direction of the plunger 7, while the impenetrable hole 42 is provided in an axial direction of the plunger 9. An opening of the impenetrable hole 42 faces the pump chamber 7. There is provided a sealing ring 43, which seals a sliding surface between the cylinder 4 and the plunger 9, between the depressing portion 40 and the center hole 16. As previously described inlet valve 10 includes a valve ball 45 and a check-spring 46. The check-spring 46 urges the valve ball 45 toward the plunger 9 so that the valve ball 45 sits a valve seat 47 formed on an edge of the impenetrable hole 42.

The pump body is inserted into the receiving hole 3 of the pump housing 2, with the bottom portion 5 of the cylinder 4 and the plug member 17 being fixed together. Then, the pump body is secured to the pump housing 2 by making a caulking portion 49 at an edge of the opening of the large diameter portion 14. At this time, an axial force toward the cylinder that is given to the plug member 17 by the caulking is received by the stepped-portion 15 that has the abutted-contact with the flange portion 22. Thus, the orifice plate 31 is placed between the bottom portion 5 and the plug member 17 being pinched by the axial force even when the bottom portion 5 and the plug member 17 are not fixed together.

There is provided a filter 50 at an outer circumferential of the groove portion 24. A sealing ring 51 is provided to seal an interface between an outer surface of the cylinder 4 and the inner surface of the receiving hole 3. The sealing ring 51 is arranged between the groove portion 24 and the center hole 16. Also, there is provided another sealing ring 52 on an outer surface of the plug member 17. With previously described arrangement of these components, the plunger 9 is reciprocated by the cam 8, thereby performing the pump function. In detail, when the plunger 9 that is received in the cylinder 4 moves toward the center hole 16 by a spring force of the spring 38, a pressure inside of the pump chamber 7 becomes negative. Thus, a brake fluid is directed to the pump chamber 7 through the inlet passage 18, the filter 50, the groove portion 24, the penetrating hole 25, the depressed-portion 40, the perforating hole 41, the impenetrable hole 42, and the inlet valve 10. At this time, the valve ball 34 of the outlet valve 6 sits on the valve seat 36 by a spring force of the check-spring 35, thus the valve ball 34 closing the valve hole 23. On the other hand, when the plunger 9 moves toward the pump chamber 7 opposite to the center hole 16 resisting the spring force of the spring 38, the valve ball 45 of the inlet valve 10 sits on the valve seat 47 provided on the impenetrable hole 42 by a spring force of the check-spring 46, thereby closing the opening of the impenetrable hole 42. An outflow of the brake fluid in the pump chamber 7 to the impenetrable hole 42 is also prevented for this reason. Thus, a pressure in the pump chamber 7 becomes high. Then, the brake fluid in the pump chamber 7 opens the outlet valve 6, and flows to the outlet chamber 30 through the valve hole 23. The brake fluid directed to the outlet chamber 30 flows to the master cylinder (not shown) through the orifice passage 32, the radius-directional aperture defined between the circumference of the bottom portion 5 and the flange 27, and the outlet passage 19. Thereby, the hydraulic pump unit carries the brake fluid from the reservoir to the master cylinder. At this time, since the brake fluid carried to the outlet passage 19 flows through the orifice passage 32 formed on the orifice plate 31 that is disposed between the bottom portion 5 and the plug member 17, a pulsation of the brake fluid is reduced preventing the pulsation from being carried to the master cylinder.

As described previously, the orifice plate 31 is disposed between the bottom portion 5 of the cylinder 4 and the plug member 17 without a fitted contact with the receiving hole 3, the cylinder 4 and the plug member 17. This precludes an incorporation of a contamination into the brake fluid caused by a removal of a part of those components. Thus, a hydraulic pump unit that prevents incorporation of a contamination into a braking fluid can be provided. Further, since the orifice passage 32 is provided with the slit formed on the orifice plate 31, it is easy to change an area of the orifice passage 32 by adjusting a thickness of the orifice plate 31 or a width of the slit, or both. The bottom portion 5 of the cylinder 4 and the plug member 17 are fixed together by caulking (or by a screwed contact with respect to each other) arranging the orifice plate 31 therebetween, thus providing an easy assembly of the orifice plate 31. Moreover, since an end portion of the slit (orifice passage 32) is provided with the large width portion, a blockage of the slit (orifice passage 32) that might occur when the bottom portion 5 and the plug portion 17 are fixed with caulked relationship can be prevented. The orifice plate 31 is provided with an annular-shaped plate, and the outlet valve 6 is arranged at the center of the orifice plate 31. Thus, a size of the hydraulic pump unit in its axial direction can be decreased.

While the present invention is described on the basis of certain preferred embodiments, it is not limited thereto, but is defined by the appended claims as interpreted in accordance with applicable law.

What is claimed is:

1. A hydraulic pump unit for vehicle brake control system comprising:
   a pump housing;
   a cylinder received in a receiving hole formed in the pump housing, the cylinder having a bottom portion and being provided at the bottom portion with an outlet valve;
   a plunger received in the cylinder with a slidable contact, the plunger being driven by a cam and defining a pump chamber in cooperation with the cylinder;
   an inlet valve provided on the plunger;
   an inlet passage formed in the pump housing, an opening of the inlet passage being provided in the receiving hole;
   an outlet passage formed in the pump housing, an opening of the outlet passage being provided in the receiving hole;
   a plug member for closing an opening of the receiving hole, the plug member being fixed to the bottom portion of the cylinder; and
   an orifice passage formed on an orifice plate, the orifice plate being arranged between the bottom portion and the plug member.

2. A hydraulic pump unit for vehicle brake control system comprising:
   a pump housing;
   a cylinder received in a receiving hole formed in the pump housing, the cylinder having a bottom portion and being provided at the bottom portion with an outlet valve;
   a plunger received in the cylinder with a slidable contact, the plunger being driven by a cam and defining a pump chamber in cooperation with the cylinder;
   an inlet valve provided on the plunger;
   an inlet passage formed in the pump housing, an opening of the inlet passage being provided in the receiving hole;
   an outlet passage formed in the pump housing, an opening of the outlet passage being provided in the receiving hole;
   a plug member for closing an opening of the receiving hole, the plug member being fixed to the bottom portion of the cylinder; and
   an orifice passage formed on an orifice plate, the orifice plate being arranged between the bottom portion and the plug member,
   wherein the orifice passage comprises a slit formed on the orifice plate.

3. The hydraulic pump unit according to claim 2, wherein the slit is formed in a radial direction of the orifice plate.

4. The hydraulic pump unit according to claim 3, wherein the bottom portion of the cylinder and the plug member are fixed together by caulking, and the orifice plate is pinched between the bottom portion and the plug member.

5. The hydraulic pump unit according to claim 3, wherein the bottom portion of the cylinder and the plug member are fixed with a screwed relationship, and the orifice plate is pinched between the bottom portion and the plug member.

6. The hydraulic pump unit according to claim 5, the slit comprises a constant width portion and a large width portion, the large width portion is provided at an outer circumferential of the orifice plate.

7. The hydraulic pump unit according to claim 3, wherein the slit comprises a constant width portion.

8. The hydraulic pump unit according to claim 7, wherein the slit further comprises a large width portion that is provided at an outer circumferential of the orifice plate.

9. The hydraulic pump unit according to claim 8, wherein the large width portion is provided with a fan-shape.

10. The hydraulic pump unit according to claim 8, wherein the orifice plate is provided with an annular shape.

11. The hydraulic pump unit according to claim 10, wherein the outlet valve is arranged at a center of the orifice plate.

12. The hydraulic pump unit according to claim 11, wherein the orifice plate is made of steel.

13. The hydraulic pump unit according to claim 12, wherein the plug member is fixed to the pump housing by caulking.

14. The hydraulic pump unit according to claim 3, the slit comprises a constant width portion and a large width portion, the large width portion is provided at an outer circumferential of the orifice plate.

15. The hydraulic pump unit according to claim 14, wherein the orifice plate is provided with an annular shape, the outlet valve is arranged at a center of the orifice plate.

16. The hydraulic pump unit according to claim 15, wherein the receiving hole comprises a large diameter portion, a small diameter portion, and a stepped-portion provided between the large diameter portion and the small diameter portion.

17. The hydraulic pump unit according to claim 16, wherein a flange portion is formed on an outer surface of the cylinder, the flange portion has an abutted-contact with the stepped-portion.

18. The hydraulic pump unit according to claim 17, wherein the opening of the outlet passage is formed at the large diameter portion, and the opening of the inlet passage is formed at the small diameter portion.

\* \* \* \* \*